US005955050A

United States Patent [19]

Drexler

[11] Patent Number: 5,955,050

[45] **Date of Patent: *Sep. 21, 1999**

[54] $NO_X$ DESTRUCTION IN SULPHURIC ACID

[75] Inventor: Drew John Drexler, Guelph, Canada

[73] Assignee: Marsulex Inc., Ontario, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,087

[22] Filed: Jun. 17, 1997

Related U.S. Application Data

[63] Continuation of application No. 08/440,476, May 12, 1995, abandoned.

[30] Foreign Application Priority Data

Oct. 26, 1994 [CA] Canada .................................. 2134270

[51] Int. Cl.[6] ............................ C01B 17/90; C01B 17/94

[52] U.S. Cl. ........................... 423/531; 423/522; 423/523

[58] Field of Search .................................... 423/522, 523, 423/531

[56] References Cited

U.S. PATENT DOCUMENTS

| | | | |
|---|---|---|---|
| 4,376,105 | 3/1983 | Matuda et al. | 423/400 |
| 5,026,535 | 6/1991 | Jonsson et al. | 423/525 |
| 5,030,436 | 7/1991 | Steadman et al. | 423/523 |

FOREIGN PATENT DOCUMENTS

| | | |
|---|---|---|
| 192929 | 11/1957 | Austria . |
| 0 460 745 A1 | 12/1991 | European Pat. Off. . |
| 28 31 941 A1 | 2/1980 | Germany . |
| 61-227905 | 10/1986 | Japan . |
| 62-105904 | 5/1987 | Japan . |
| 6-219711 | 8/1994 | Japan . |
| 948381 | 2/1964 | United Kingdom . |
| 1117755 | 6/1968 | United Kingdom . |

*Primary Examiner*—Gary P. Straub
*Assistant Examiner*—Timothy C. Vanoy
*Attorney, Agent, or Firm*—Pillsbury Madison & Sutro Intellectual Property Group

[57] ABSTRACT

A process is provided for the destruction of nitrogen oxides in sulfuric acid by adding a reducing agent, such as hydrazine, sulfamic acid or urea, and an oxidizing agent, such as hydrogen peroxide or persulfates, into the nitrogen oxides contaminated sulfuric acid. The nitrogen oxides contaminated sulfuric acid is treated at a temperature between 15° C. and 100° C.

13 Claims, No Drawings

$NO_X$ DESTRUCTION IN SULPHURIC ACID

This is a continuation of National Application Ser. No. 08/440,476 filed May 12, 1995, now abandoned

FIELD OF THE INVENTION

This invention relates to a process for the treatment of sulphuric acids, and in particular, to the removal of various oxides of nitrogen ($NO_x$) from said acids.

DESCRIPTION OF THE RELATED ART

Nitrososulphuric acid ($NOHSO_4$) is believed to be the predominant oxide of nitrogen ($NO_x$) species present in sulphuric acids of certain metallurgical smelters, and in some cases, of certain sulphur burning sulphuric acid plants. Other oxides of nitrogen may, however, also be present. Whatever the particular species of nitrogen oxides, acids containing $NO_x$ are generally unacceptable to many customers and are unsuitable for use in many processes. This places severe constraints on the size of the market available for such $NO_x$-containing sulphuric acids.

It is known in the sulphuric acid production industry to add strong reducing agents, such as hydrazine hydrate or hydrazine sulfate, to the product acid in order to destroy $NO_1$. However, hydrazine is a hazardous material requiring specialized handling techniques, and requires elevated temperatures and relatively long reaction times (circa 1 to 5 hours) to effect the removal of the $NO_x$. Additionally, hydrazine is a suspected carcinogen. Thus, any residual hydrazine in the treated acid must be destroyed by the addition of an oxidant, such as, for example, hydrogen peroxide to the acid after the $NO_x$ has been reduced to a suitable level. Other less toxic reducing agents, such as ammonium sulfate, urea and sulfamic acid, can also be used for removing $NO_x$ from sulphuric acid. However, these additives generally react too slowly with the $NO_x$ in concentrated sulphuric acid under acid plant conditions to be of much practical use.

Sulfamic acid is also useful for destruction of nitrous acid in dilute (less than 70% $H_2SO_4$) sulphuric acid. It is well known that sulfamic acid reacts quantitatively with $HNO_2$ in dilute acids to form nitrogen and water. Indeed, the classical analytical method for determination of sulfite in water requires the removal of nitrite using sulfamic acid prior to titration with iodine solution. (NOTE: $NaNO_2$ forms nitrous acid in dilute acids and nitrososulphuric acid in solutions containing greater than about 65% $H_2SO_4$)

Sulfamic acid is used commercially for removal of "nitrous acid" impurities from sulphuric acid and from hydrochloric acid. However, the reaction between "nitrous acid" (nitrososulphuric acid in concentrated $H_2SO_4$) and sulfamic acid is very slow in concentrated sulphuric acid (>90% $H_2SO_4$). In fact, the more concentrated the acid is, the slower the reaction between $NO_x$ and any reducing agent.

Sulfamic acid alone would not be a viable treatment agent for concentrated $H_2SO_4$ unless very long residence times (ie., many large storage tanks) were provided.

Hydrazine is used by some sulphuric acid producers in North America for $NO_x$ reduction. However, in order to achieve satisfactory $NO_x$ reduction rates, excess hydrazine (based on stoichiometry) is added to the acid. Residual hydrazine in the acid is then destroyed with peroxide after $NO_x$ has been reduced to acceptable levels. Other $NO_x$ destruction techniques have also been described. For example, Austrian patent No. 192929, issued Dec. 10, 1957, describes a process for the removal of $NO_x$ from sulphuric acids wherein $NO_x$-containing $H_2SO_4$ is treated with hydrogen peroxide to convert trivalent nitrogen species to the pentavalent species. After the oxidation stage is completed, the pentavalent species are then reduced with a chemical reducing agent to lower valency nitrogen compounds. However, the reaction stoichiometry of the described process is questionable, and this two-stage process has met with little acceptance in the industry.

Further, this two-stage process has also been described in UK Patent No. 948,381, issued Feb. 5, 1964 (which is directed to an electrochemical $NO_x$ destruction process), wherein it is stated that the above described two-stage process results in contamination of the sulphuric acid. This contamination occurs when the chemical reaction of the $NO_x$-reducing agent(s) is not complete, when products of the chemical reactions remain dissolved in the acid, or when the sulphuric acid is diluted by the solvent, such as water, used for the addition of the reactive chemical reagents.

Thus, it would be desirable in the sulphuric acid production industry to provide a process for the removal of $NO_x$ from sulphuric acid, which process avoids the problems of the prior art, and which process is suitable for use under normal production conditions.

SUMMARY OF THE INVENTION

Accordingly, the present invention provides a process for the removal of $NO_x$ (oxides of nitrogen) from sulphuric acid, which process comprises treating an $NO_x$-containing sulphuric acid with a suitable chemical oxidizing agent in the presence of a suitable chemical reducing agent, which reducing agent is essentially non-reactive with said oxidizing agent in said acid.

Thus, the present invention provides a process wherein the oxides of nitrogen present in the sulphuric acid are oxidized, and then reduced to nitrogen or to a volatile oxide of nitrogen; either of which are released from the sulphuric acid product. The reaction system of the present invention thus comprises (and preferably simultaneously comprises) both an oxidizing agent and a reducing agent.

The reducing agent selected is sufficiently non-reactive with the oxidizing agent, in the reaction system, that both species remain present in the system for a sufficient period of time for the removal of $NO_x$ to be effected.

The present invention is of most utility in applications involving concentrated sulphuric acid. The term "concentrated sulphuric acid", however, is to be interpreted to include all sulphuric acids of strength greater than 75% strength. This includes sulphuric acids of greater than 100% (termed in the industry as oleum). Preferred acids, however, have concentrations of between 75 and 100%, and more preferably between 85 and 99%. Most preferably the acid has a concentration of between 93 and 99%. The acid may be obtained from a variety of sources, but the present invention is directed to sulphuric acids which are contaminated with $NO_x$. $NO_x$-contaminated acids are obtained from a variety of sources, and can included sources such as smelter acid production, by spent or waste acid regeneration, or by sulphur burners, spent acid burners, and the like, known within the industry.

The level of $NO_x$ present in the acid to be treated (or the source acid) is generally less than about 1000 ppm, and more preferably less than about 600 ppm (unless otherwise indicated, all references to $NO_x$ concentration in this document are to oxides of nitrogen expressed as $N_3$) . Preferably, however, the source acid has an $NO_x$ concentration of less than about 300 ppm, and most preferably, the source acid has an $NO_x$ concentration of less than 100 ppm. After treatment, the level of $NO_x$ in the treated acid (or product acid) is preferably less than about 50 ppm, more preferably less than 25 ppm, and most preferably less than 10 ppm.

Suitable oxidizing agents include those agents which are sufficiently stable in concentrated acid and which are able to oxidize the various oxides of nitrogen typically found in the acid to higher nitrogen oxidation states. These oxidizing agents include compounds such as inorganic or organic peroxides, persulphates (including ammonium or an alkali or alkali earth metal salt such as, for example, potassium persulphate), ozone, hypochlorites or permanganates, and the like, or materials which will generate suitable oxidizing agents, in situ. However, most preferably, the oxidizing agent is hydrogen peroxide, and most preferably is a 30 or 50% solution of hydrogen peroxide in water.

Hydrogen peroxide is typically added as an aqueous solution. Generally, higher solution concentrations are preferred in order to reduce the amount of added water. However, using the preferred embodiments of the present invention, little additional water is added to the sulphuric acid product.

Suitable reducing agents include those agents which are sufficiently stable in concentrated acid, and which are able to reduce the various oxides of nitrogen found in the acid, or created in the acid by the oxidizing agent, to lower nitrogen oxidation states, or to nitrogen, per se. These reducing agents include compounds such as urea, sulfamic acid and the like, or materials which will generate suitable reducing agents, and in particular sulfamic acid, in situ, such as, for example sulfamide, or sulfamates such as, for example, ammonium sulfamate, and the like. However, a most preferred reducing agent is sulfamic acid.

The reducing agent and the oxidizing agent can be added in any order. However, it is a key feature of the present invention that both the reducing agent and the oxidizing agent may be present simultaneously in the acid. Accordingly, it is preferable that the oxidizing agent and the reducing agent be mutually compatible so as to be essentially non-reactive with each other in the reaction system. Generally, the oxidizing agent and reducing agent are considered essentially non-reactive if there is less than 50% destruction of the oxidizing or reducing agent in 1 hour at 65° C. in a $NO_x$-free 93–99% strength acid. Preferably, there is less than 25% destruction, more preferably less than 10% destruction, and most preferably less than 5% destruction, under these test conditions.

While the oxidizing agent may be added to the acid prior to the reducing agent, or simultaneously with the reducing agent, it is a preferred feature of the present invention, that the oxidizing agent be added after the reducing agent. This procedure ensures that only the minimum amount of oxidizing agent necessary for oxidation is added to the reaction system.

For example, in a preferred reaction system utilizing sulfamic acid as reducing agent and hydrogen peroxide as an oxidizing agent, in an $NO_x$-containing sulphuric acid, the hydrogen peroxide can be utilized as an "activation" agent, which allows the rapid destruction of $NO_x$ in concentrated sulphuric acid under conditions available in most acid plants. In this system, the sulfamic acid is not readily destroyed in hot (65° C.) 96% $H_2SO_4$ which contains hydrogen peroxide. This means that stoichiometric amounts of peroxide only (based on the initial concentration of nitrososulphuric acid) are required for $NO_x$ activation. Hydrogen peroxide treatment of $NO_x$-containing acid in the presence of sulfamic should lead to a reduction in the amount peroxide needed for $NO_x$ removal.

It should be noted that in the absence of sulfamic acid, nitrylsulphuric acid reacts with hydrogen peroxide to produce water, oxygen and nitrososulphuric acid, which material consumes yet more peroxide. This reaction sequence leads to the catalytic destruction of the peroxide added as shown in the following equations:

$$NOHSO_4+H_2O_2\rightarrow NO_2HSO_4+H_2O \qquad \text{I}$$

$$NO_2HSO_4+H_2O_2\rightarrow NOHSO_4+H_2O+O_2 \qquad \text{II}$$

The addition of peroxide only, or peroxide first, will result in the loss of peroxide, and will require additional peroxide over the stoichiometric value required in the preferred system of the present invention.

Thus, while the present invention permits the use of stoichiometric levels of both oxidizing and reducing agents, higher levels, such as, for example, levels of as high as 5 times stoichiometric levels may be used. However, preferably the level of oxidizing or reducing agent is less that 2 times stoichiometric, and most preferably less than 1.25 times stoichiometric when calculated according to the following reactions:

Oxidation (with, for example, hydrogen peroxide)

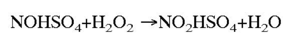

$$NOHSO_4+H_2O_2\rightarrow NO_2HSO_4+H_2O$$

Reduction (with, for example, sulfamic acid)

$$NO_2HSO_4+H_2NSO_3H\rightarrow N_2O+2H_2SO_4$$

Preferably, the level of oxidizing agent and reducing agent are both between 1 and 1.5 times the stoichiometric level.

The process of the present invention is relatively rapid compared to prior art process. Preferably, the reaction of the present invention is conducted in less than 1 hour, at 65° C., to achieve an 75%, and more preferably, a 90% reduction in $NO_x$ concentration. More preferably, the reaction process achieves these reductions in $NO_x$ concentration in less than 30 minutes at the same temperature. Most preferably, the $NO_x$ concentration is reduced by at least 75% within 15 minutes at 65° C.

It will be apparent to the skilled artisan, that any suitable temperature may be used to remove the $NO_x$ provided that the acid, oxidizing agent and reducing agent are sufficiently stable for the desired reaction to proceed. However, longer time periods may be encountered for lower temperatures.

Preferably, the reaction is conducted at a temperature of between 15° C. and 100° C., more preferably between 30° C. and 80° C., and most preferably, between a temperature of 50° C. and 70° C.

Results show, surprisingly, that sulfamic acid and hydrogen peroxide co-exist in concentrated sulphuric acid at 65° C. In practise, this permits the $NO_x$-containing acid to be treated first with sulfamic acid to gain maximum contact time between $NO_x$ and reducing agent. The hydrogen peroxide, as oxidizing agent, can then be added to the acid in stoichiometric amounts (ie., that amount of peroxide needed to oxidize nitrososulphuric acid to nitrylsulphuric acid.) Sulfamic acid is then available to react with nitrylsulphuric acid as this species is formed. This results in a more rapid $NO_x$ removal and in reduced peroxide consumption since, as previously stated, nitrylsulphuric acid reacts with excess hydrogen peroxide to form oxygen, water and additional nitrososulphuric acid. With sulfamic acid present, addition of hydrogen peroxide reduces $NO_x$ concentrations from high levels (such as about 60–70 ppm $NO_x$) to acceptable values (such as less than about 10 ppm $NO_x$) under conditions readily available in the product acid pump tanks typically found in industrial applications (e.g. 65° C. with a one hour residence time).

The preferred procedure at acid plants would be to first treat the acid with stoichiometric amounts of sulfamic acid (1.57 parts, by weight, sulfamic acid per one part $NO_x$ measured in the acid), followed by addition of "stoichiometric" amounts of hydrogen peroxide (based on $NO_x$ content). Additional hydrogen peroxide, or oxidizing agent, can be added to also reduce the level of, or eliminate, any sulphur dioxide present in the acid. With acids containing high concentrations of sulphur dioxide, an additional, follow-up treatment with hydrogen peroxide may be required for suitable $SO_2$ removal since $NO_x$ catalyzes peroxide decomposition, and thus reduces the amount of peroxide available for $SO_2$ destruction.

Accordingly, in a preferred embodiment, the present invention provides a process as described hereinabove, comprising treating an $NO_x$-containing concentrated sulphuric acid of 93 to 99% acid strength by:

i) mixing a suitable reducing agent, and preferably, sulfamic acid with said acid in an amount of between 1 and 1.5 times the stoichiometric amount necessary to reduce all of the $NO_x$ species, if present as nitrylsulphuric acid, to nitrogen or to a volatile oxide of nitrogen;

ii)subsequently adding a suitable oxidizing agent, and preferably hydrogen peroxide, to said acid in an amount of between 1 and 1.5 times the stoichiometric amount necessary to oxidize all of the $NO_x$ species, if present as nitrososulphuric acid, to nitrylsulphuric acid; and iii) maintaining said acid at a temperature of between 15° C. and 100° C., preferably for at least about 1 hour.

In a further aspect, the present invention also provides a sulphuric acid which has been produced by any of the process described hereinabove.

The invention will now be described by way of example only, by reference to the following experimental results.

EXAMPLES

Example 1

A series of experiments were conducted in which various reducing agents were added to a concentrated sulphuric acid (96%) which contained approximately 123 ppm of nitrososulphuric acid ($NOHSO_4$) (and which corresponds to 60 ppm of $NO_x$ when expressed as $NO_3$) Hydrogen peroxide, as oxidizing agent, was added to the various systems 10 minutes before or 10 minutes after the addition of the various reducing agents, or was omitted in order to determine the effect of the reducing agent only. The treated acid was left at 65° C. for various time periods and the level of residual $NO_x$ was measured.

Results show that peroxide has little or no effect on the enhancement of $NO_x$ removal from hot concentrated sulphuric acid when formic acid, hydrazine, hydroxylamine sulfate and ammonium sulfate are used as reducing agents. The tests also show that peroxide rapidly destroys hydrazine at 65° C., thus reducing the amount of hydrazine available for $NO_x$ removal.

However, the results show that addition of hydrogen peroxide to $NO_x$-containing 96% $H_2SO_4$ at 65° C. does accelerate $NO_x$ removal when urea is used as a reducing agent. Although, even with peroxide addition, the reaction between urea and $NO_x$ may still be too slow at this temperature to be of commercial utility since complete $NO_x$ removal would probably require several days at 65° C.

Clearly, however, the combination of peroxide and sulfamic acid showed rapid $NO_x$ removal with almost all $NO_x$ removed after less than 1 hour.

TABLE 1

Removal of $NO_x$ from 96% Sulphuric Acid at 65° C.

| | Timing of Addition of $H_2O_2$ - Effect on removal of $NO_x$ over time (hrs) | | | | | |
|---|---|---|---|---|---|---|
| | $H_2O_2$ After* | | $H_2O_2$ Before* | | No $H_2O_2$ | |
| Reducing Agent | Hrs. | ppm $NO_x$ | Hrs. | ppm $NO_x$ | Hrs. | ppm $NO_x$ |
| Ammonium | 0.00 | 59.3 | 0.00 | 59.3 | 0.00 | 59.3 |
| Sulphate | 1.25 | 54.6 | 1.25 | 57.4 | 1.25 | 54.0 |
| Formic Acid | 0.00 | 59.3 | 0.00 | 58.1 | 0.00 | 59.3 |
| | 22.0 | 54.7 | 1.25 | 58.0 | 22.0 | 53.4 |
| Hydrazine | 0.00 | 56.3 | 0.00 | 58.1 | 0.42 | 53.3 |
| | 0.30 | 55.1 | 2.00 | 43.3 | 0.80 | 48.0 |
| | 0.68 | 54.5 | 18.0 | 16.0 | 1.25 | 44.0 |
| | 1.13 | 53.5 | 42.0 | 11.6 | 2.00 | 37.5 |
| | 2.00 | 53.7 | | | 3.00 | 32.3 |
| | 19.5 | 49.6 | | | 19.5 | 0.40 |
| Hydroxylamine | 0.00 | 59.3 | 0.00 | 58.1 | 0.00 | 59.3 |
| Sulphate | 1.53 | 87.6 | 2.00 | 78.7 | 1.53 | 59.3 |
| Sulfamic Acid | 0.00 | 59.3 | 0.00 | 58.1 | 0.00 | 59.3 |
| | 0.25 | 10.9 | 1.16 | 0.40 | 1.00 | 59.3 |
| | 0.47 | 5.9 | | | 18.2 | 57.8 |
| | 0.80 | 3.9 | | | | |
| Urea | 0.00 | 59.3 | 0.00 | 58.1 | 0.00 | 59.3 |
| | 0.58 | 56.9 | 2.00 | 52.6 | 0.58 | 58.8 |
| | 5.50 | 54.5 | 18.0 | 42.7 | 5.50 | 58.8 |
| | 24.0 | 27.1 | 42.0 | 36.4 | 24.0 | 55.9 |

*Peroxide after - Peroxide added 10 minutes after reducing agent
*Peroxide before - Peroxide added 10 minutes before reducing agent

Example 2

$NO_x$-free, 96% sulphuric acid was treated at 65° C. with 34 ppm $H_2O_2$ (using an aqueous solution of 30% $H_2O_2$). This acid was then immediately treated with 78 ppm of sulfamic acid. The acid was kept at 65° C. and analyzed for residual peroxide. After 35 minutes the acid contained 31 ppm $H_2O_2$. After 65 minutes at 65° C., the acid still contained 31 ppm $H_2O_2$ demonstrating the compatibility of the sulfamic acid with the hydrogen peroxide in concentrated sulphuric acid.

This acid mixture was then treated with 49.5 ppm $NO_x$ (equivalent to 101 ppm $NOHSO_4$) and left at 65° C. One hour after $NO_x$ addition, no $NO_x$ was detected in the treated acid.

This test shows that: i) peroxide does not destroy sulfamic acid in concentrated sulphuric acid at 65° C.; and ii) "stoichiometric" amounts of peroxide (based on $NOHSO_4$ concentration) are desirable in order to activate $NO_x$ for destruction with sulfamic acid (Note: Thirty-four ppm $H_2O_2$ is 1.25× the stoichiometric amount of peroxide needed to convert 101 ppm $NOHSO_4$ to $NO_2HSO_4$. A slight excess of peroxide was used in this test to compensate for the typical loss of peroxide that occurs on addition to hot sulphuric acid).

Example 3

A series of experiments was conducted on an actual sample of an $NO_x$-contaminated, smelter-produced sulphuric acid at different temperatures. The experiments included treatment of the acid with a mixture of sulfamic acid and hydrogen peroxide, a comparison experiment with sulfamic acid only, and a comparison experiment with hydrogen peroxide only. The results are presented in Tables 2 and 3.

TABLE 2

$NO_x$ Destruction in Smelter Acid at 35° C.

| 93% $H_2SO_4$ treated with 60 ppm $H_2O_2$ and 140 ppm SA | | 93% $H_2SO_4$ treated with 148 ppm SA only | |
|---|---|---|---|
| Hours after Reagents added | ppm $NO_x$ | Hours after Reagent added | ppm $NO_x$ |
| 0 | 55.9 | 0 | 59.4 |
| 0.17 | 17.6 | 1.0 | 59.8 |
| 0.50 | 4.7 | 168 | 59.2 |
| 58.0 | 0 | — | — |

Notes:
SA = Sulfamic acid
SA added on a basis of 2.5 ppm SA per 1 ppm $NO_x$.

TABLE 3

$NO_x$ Destruction in Smelter Acid at 65° C.

| 93% $H_2S_4$ treated with 115 ppm $H_2O_2$ only | | 93% $H_2SO_4$ treated with 115 ppm $H_2O_2$ + 100 ppm SA | |
|---|---|---|---|
| Hours after Reagent added | ppm $NO_x$ | Hours after Reagents added | ppm $NO_x$ |
| 0 | 66.3 | 0 | 63.8 |
| 0.67 | 65.4 | 0.16 | 3.6 |
| 4.0 | 64.6 | — | — |

Note: Both acids initially contained 150 ppm sulfur dioxide.

Example 4

An experiment was conducted on an $NO_x$-contaminated sulphuric acid using potassium persulphate as oxidizing agent and sulfamic acid as reducing agent. The results of this experiment are presented in Table 4.

TABLE 4

$NO_x$ Destruction in Smelter Sulphuric Acid at 65° C.

| 98% Sulphuric Acid treated with 400 ppm Potassium Persulphate & 107 ppm Sulfamic Acid | | 98% Sulphuric Acid treated with 107 ppm Sulfamic Acid | |
|---|---|---|---|
| Hours after Reagents Added | ppm $NO_x$ | Hours after Reagent Added | ppm $NO_x$ |
| 0 | 75.6 | 0 | 75.6 |
| 1.0 | 10.1 | 1.0 | 70.9 |
| 18.5 | <1 | 18.5 | 68.0 |

The results clearly show that the use of potassium persulphate, in combination with sulfamic acid, provides an effective method for the removal of $NO_x$ from smelter acid.

Having described specific embodiments of the present invention, it will be understood that modifications thereof may be suggested to those skilled in the art, and it is intended to cover all such modifications as fall within the scope of the appended claims.

The embodiments of the invention in which an exclusive property or privilege is claimed are defined as follows:

1. A process for the removal $NO_x$(oxides of nitrogen) from sulphuric acid comprising treating an $NO_x$-containing sulphuric acid of acid strength greater than 75% at a temperature of between 15° C. and 100° C. by:

i) mixing a reducing agent selected from the group consisting of hydrazine, sulfamic acid and urea with said sulphuric acid in an amount of between 1 and 2 times the stoichiometric amount necessary to reduce all of the $NO_x$ species, expressed in equivalents of nitrylsulphuric acid, to nitrogen or to a volatile oxide of nitrogen; and ii) subsequently adding an oxidizing agent selected from the group consisting of hydrogen peroxide and persulfates to said sulphuric acid in an amount of between 1 and 2 times the stoichiometric amount necessary to oxidize all of the $NO_x$ species, expressed in equivalents of nitrososulphuric acid, to nitrylsulphuric acid.

2. A process as claimed in claim 1 wherein said sulphuric acid has a concentration of between 93 and 99%.

3. A process as claimed in claim 1 wherein said sulphuric acid is obtained by smelter acid production, by spent or waste acid regeneration, or from a sulphur burner.

4. A process as claimed in claim 1 wherein said sulphuric acid has an $NO_x$ level of less than about 1000 ppm prior to treatment.

5. A process as claimed in claim 4 wherein said sulphuric acid has an $NO_x$ level of less than 100 ppm prior to treatment.

6. A process as claimed in claim 1 wherein the $NO_x$ level in said sulphuric acid is reduced to a level of less than about 50 ppm.

7. A process as claimed in claim 6 wherein the $NO_x$ level in said sulphuric acid is reduced to a level of less than about 10 ppm.

8. A process as claimed in claim 1 wherein both said oxidizing agent and said reducing agent are added simultaneously to said $N_x$-containing sulphuric acid.

9. A process as claimed in claim 1 wherein said reducing agent is added to said $NO_x$-containing sulphuric acid prior to the addition of said oxidizing agent.

10. A process as claimed in claim 1 wherein said reducing agent is essentially non-reactive with said oxidizing agent in said acid.

11. A process as claimed in claim 10 wherein said oxidizing agent and said reducing agent are mutually compatible so that there is less than 50% destruction of the oxidizing or reducing agent in 1 hour at 65° C. in a $NO_x$-free 93–99% strength acid.

12. A process as claimed in claim 11 wherein there is less than 10% destruction of the oxidizing or reducing agent.

13. A process as claimed in claim 1 wherein said temperature is between 50° C. and 70° C.

* * * * *

UNITED STATES PATENT AND TRADEMARK OFFICE
CERTIFICATE OF CORRECTION

PATENT NO. : 5,955,050
DATED : September 21, 1999
INVENTOR(S) : DREXLER

It is certified that error appears in the above-identified patent and that said Letters Patent is hereby corrected as shown below:

In column 8, after claim 13, insert

--14. A process as claimed in claim 1 wherein said oxidizing agent is hydrogen peroxide.
15. A process as claimed in claim 1 wherein said reducing agent is urea or sulfamic acid.
16. A process as claimed in claim 1 wherein said reducing agent is sulfamic acid.
17. A process as claimed in claim 2 wherein the oxidizing agent is hydrogen peroxide and the reducing agent is sulfamic acid.
18. A process as claimed in claim 11 wherein the oxidizing agent is hydrogen peroxide and the reducing agent is sulfamic acid.--

Signed and Sealed this

Ninth Day of May, 2000

*Attest:*

Q. TODD DICKINSON

*Attesting Officer*

*Director of Patents and Trademarks*